W. P. GOOLMAN.
Mole-Plow.
No. 23,334.
Patented Mar 22, 1859.
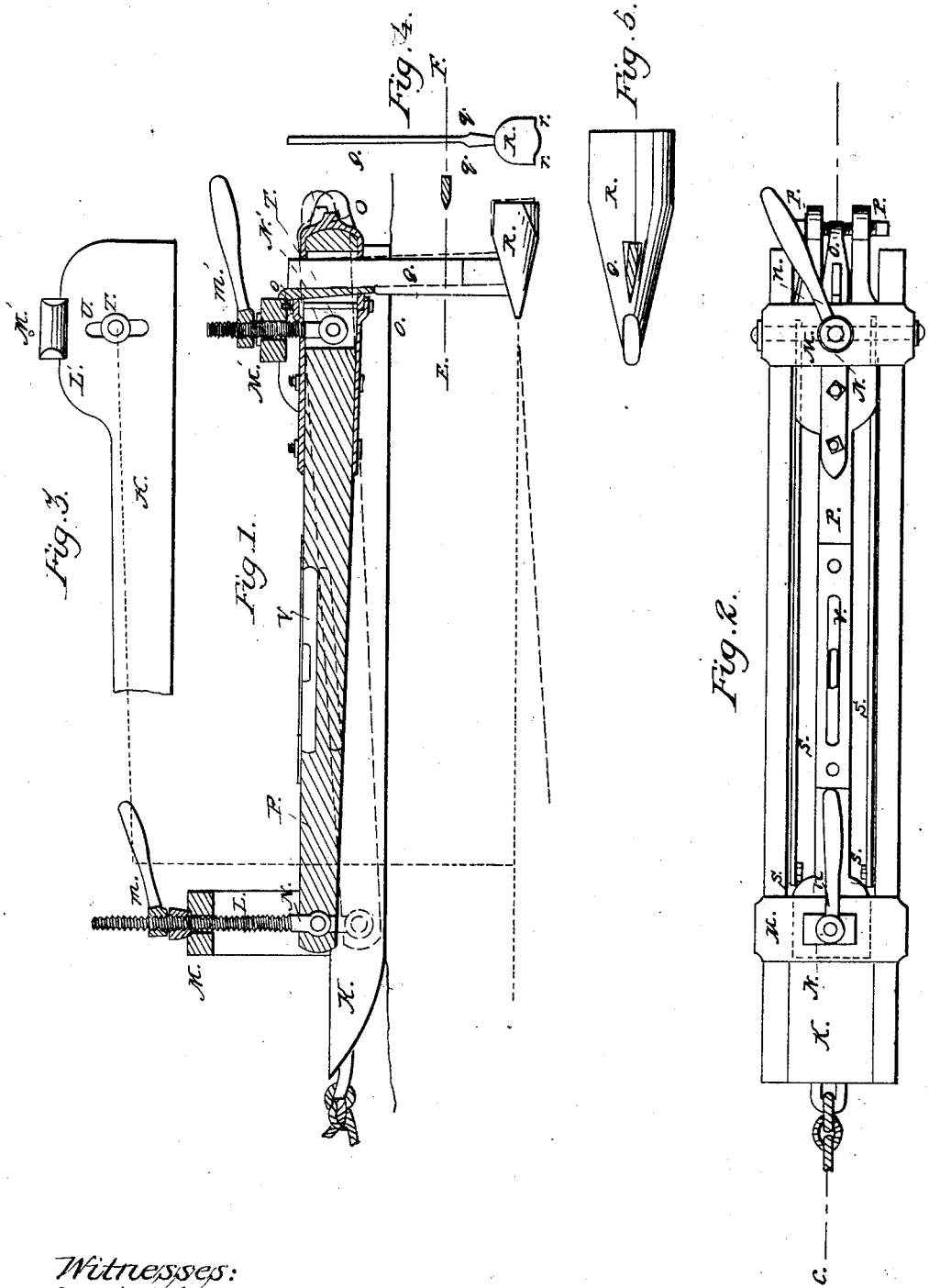
Witnesses:
Inventor:

UNITED STATES PATENT OFFICE.

W. P. GOOLMAN, OF DUBLIN, INDIANA, ASSIGNOR TO HIMSELF, SAML. B. MORRIS, AND W. HOLLINGSWORTH, ALL OF SAME PLACE.

IMPROVEMENT IN MOLE-PLOWS.

Specification forming part of Letters Patent No. 23,334, dated March 22, 1859.

*To all whom it may concern:*

Be it known that I, WILLIAM P. GOOLMAN, of Dublin, in the county of Wayne and State of Indiana, have invented a new and useful Improvement in Drain-Plows; and I hereby declare the following to be a full and exact description of the same, reference being had to the accompanying drawings, making part of this specification.

The object of the present invention is to adapt a mole-plow to produce or prevent lateral curves in the drain without changing the point of draft by adjusting the direction of the mole in a horizontal plane.

In the accompanying drawings, Figure 1 is a sectional elevation of the plow on the line C D, Fig. 2. Fig. 2 is a plan of the plow. Fig. 3 is a side elevation of a part of the sled. Fig. 4 is a rear view of the mole and colter. Fig. 5 is an enlarged plan of the mole, showing the colter in section on the line E F.

K represents a sled provided with standards L L' and cross-bars M M', which, by means of screw-threaded rods N N', afford means of suspension and adjustment for a beam, P.

O is a staple pivoted at $o$ to the beam P, and adjustable in a horizontal plane to any angle by means of set-screws $p$ $p$. The colter Q is rigidly and firmly attached at its upper and lower ends, respectively, to the staple O and the mole R.

S S are draft-rods pivoted at $s$, near the forward end of the sled.

T is a transverse rod passing through eyes in the rear ends of the draft-rods S, and in the lower end of the screw-rod N', so as to afford at once the means of suspension for the rear end of the beam and the means by which draft is imparted from the rods S S to the beam, and thus to the mole. The ends of the rod T occupy slots U in the sled or standards concentric with the front pivots of the draft-rods S, so as to permit the vertical motion of the rear end of the beam.

The colter is attached to the mole near the point of the latter, as represented in the drawings. The said mole is in front of conical form and at its rear part cylindrical. Its extreme point is chamfered above and below to a knife-edge.

$r$ $r$ are wings or fins formed at the rear end of the mole, near its bottom, as clearly shown in Figs. 1 and 4. The said pins have level soles and sides, nearly in the form of the mold-board of a common plow, flaring outward and upward sufficiently to present at the back part vertical lines tangential to the periphery of the mole, as seen in Fig. 4. The colter Q tapers downward to a short distance above the mole, where it suddenly flares so as to produce on its rear edge shoulders $q$ $q$, as exhibited in Fig. 4, and from thence the sides rapidly converge again to a point on a level with the highest portion of the mole, from whence to the point of attachment the colter is made as thin as is consistent with strength.

V is a spirit-level parallel with the axis of the mole.

From observation of the form of the mole R it will be seen that when forced through the ground its inclination is to continue in a right line in any direction in which it may be presented.

The operation is as follows: The mole is first introduced to a proper depth into the ground and the nut $n'$ elevated on its rod N, so as to allow the plow to rise sufficiently to pass over slight inequalities in the ground without elevating the mole. The beam P is then adjusted by means of the screw-rod N to a horizontal position or to accord with any inclination desired in the drain, and so maintained while the plow is drawn forward. The mole will thus, from its natural tendency, produce a drain in accordance with the direction at which it is originally set without being affected by inequalities in the surface of the ground. It will be apparent that the screw-rod N' operates only to limit the maximum depth to which the mole can penetrate beneath the surface, and that the office of the rod N is to regulate the pitch of the mole and to so adjust the beam in accordance with the indications of the spirit-level as to prevent the pitch of the mole being affected by inequalities in the surface of the ground.

When it is desired to produce horizontal curves in the drain or obviate side slippage on a hillside the object is effected without changing the point of draft by altering the direction of the mole by means of the set-screws $p\ p$, operating on the pivoted staple O, in which the colter is fixed.

The operation of the mole in passing through the ground is to first compress the earth equally on all sides, producing a cylindrical aperture which is, by the subsequent upward and lateral pressure of the pins $r\ r$, transformed into an arch with vertical compressed sides and a floor having a compressed concave channel in the center, and on each side of the said channel a space of loose earth favorable for the admission of water to the central channel. The colter, by its peculiar form, as previously described, produces in passing through the ground an aperture which is narrower near the mole than a short distance above, the effect of which is that the earth forced into said aperture by the largest portion of the mole is detained on a principle similar to the keystone of an arch.

The following are advantages which are believed to be peculiar to this improvement in drain-plows:

First, the level of the drain is not affected by inequalities in the surface of the ground.

Second, lateral curves may be produced or a disposition to side slippage obviated without changing the point of draft, in addition to which it may be observed that the mole can be run into or out of the ground with great facility by depressing or raising the beam, and also that the peculiar form of the mole is such as to prevent any current of water flowing in contact with the sides of the drain, a central water-channel being produced of greater depth than could be formed toward the sides by any unequal depression of the sides of the mole.

I claim as new and of my invention and desire to secure by Letters Patent—

The arrangement, substantially as set forth, of devices for producing or preventing lateral curves in a drain by adjusting the presentation of the mole independently of the point of draft.

In testimony of which invention I hereunto set my hand.

W. P. GOOLMAN.

Witnesses:
GEO. H. KNIGHT,
FRANCIS MILWALD.